May 28, 1940.                 J. MIKULASEK                 2,202,667
                             FLUTED DRIVE TORQUE
                            Filed Sept. 17, 1937

INVENTOR.
John Mikulasek,
BY Parkinson + Lane
ATTORNEYS.

Patented May 28, 1940

2,202,667

UNITED STATES PATENT OFFICE 2,202,667

FLUTED DRIVE TORQUE

John Mikulasek, Newton, Iowa, assignor to The Maytag Company, Newton, Iowa, a corporation of Delaware Application September 17, 1937, Serial No. 164,379

4 Claims. (Cl. 287—53)

The present invention relates to a drive torque and more particularly to a novel combination of complementary torque members having tapered flutes for driving engagement.

Among the objects of the present invention is to provide a novel construction of torque assembly for mounting and driving the agitator of a washing machine.

A further object of this invention is the provision of novel complementary torque members, one to be mounted on the drive member and the other on the driven member in such manner as to compensate for wear and play between the parts. In the rotation or oscillation of an agitator for a washing machine, there is a tendency for play to develop between the drive and driven parts due to the rapid oscillation and change of direction of travel at the end of each stroke. By the present novel invention, the tendency of the parts to wear is considerably lessened by providing complementary torque members having contact throughout substantially their entire surface area.

A further object of the present invention is to provide a novel combination of male and female torque members having complementary tapered flutes and ribs so constructed, arranged and related as to contact and provide a driving connection throughout substantially their entire effective surface area, thereby providing an efficient connection and appreciably reducing the tendency of wear between the complementary parts. The present invention has a distinct advantage over the use of tapered splines in that in the latter structure the splines contact merely on their circumferential driving faces and there is thus a greater degree of wear and less efficient mounting and drive connection than in the present construction.

Further objects, advantages and capabilities will be apparent from the description and disclosure in the drawing or are inherent in the device.

Figure 1:
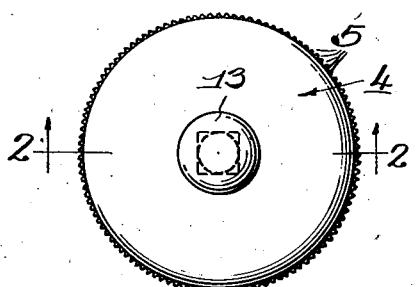
Figure 1 is a plan view of the agitator center post.
Figure 4:
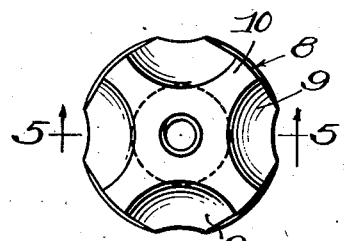
Fig. 4 is a plan view of the male torque member.
Figure 6:
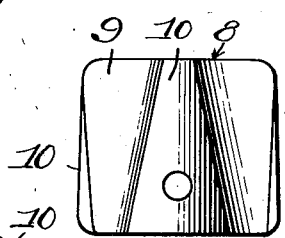
Fig. 6 is a view in side elevation of the male member.
Figure 2:
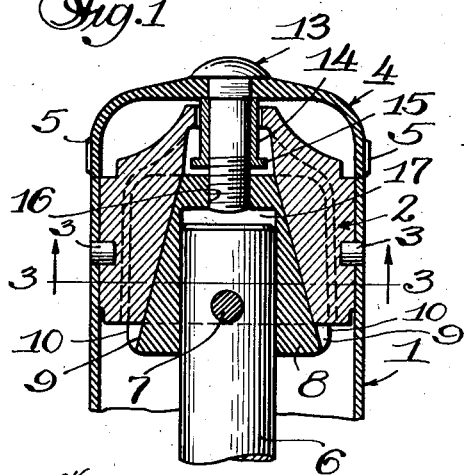
Fig. 2 is a fragmentary view in vertical cross-section taken on the line 2—2 of Fig. 1.
Figure 5:
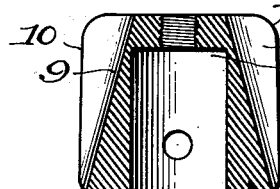
Fig. 5 is a view in vertical cross-section taken on the line 5—5 of Fig. 4.
Figure 7:
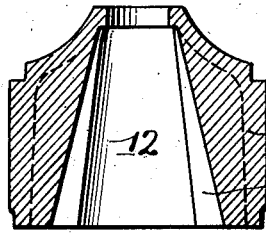
Fig. 7 is a view in vertical cross-section of the female torque member.
Figure 3:
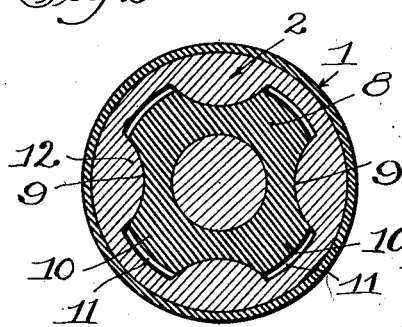
Fig. 3 is a view in horizontal cross-section taken on the line 3—3 of Fig. 2.
Figure 9:
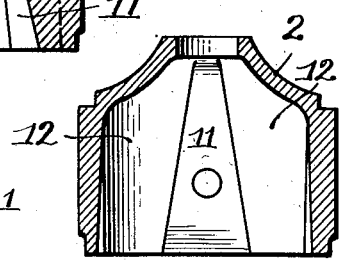
Fig. 9 is a view in vertical cross-section taken in a plane represented by line 9—9 of Fig. 8.
Figure 8:
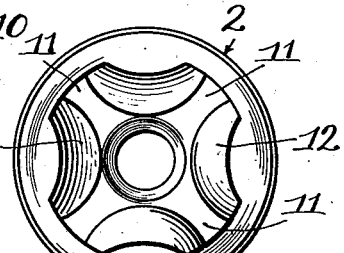
Fig. 8 is a bottom view of the female drive member.

Referring more particularly to the disclosure in the drawing, the embodiment selected to illustrate the novel invention comprises a fluted drive torque for detachably mounting and driving an agitator of a washing machine or the like. These agitators are provided with a center post 1 to which is connected a female drive member or torque socket 2 by means of a pin or the like 3, and a cap 4 having a knurled periphery 5. A drive shaft 6 normally extending through the bottom or base of the tub is adapted to drive the agitator. Mounted adjacent the upper end of the drive shaft by means of a pin, key or the like 7 is a male drive member or block 8 having engaging means complementary with engaging means on the inner surface of the drive member 2.

In the present novel construction, the male member is provided with spaced flutes 9 and ribs 10 adapted to interlock or engage complementary flutes 11 and ribs 12 on the inner surface of the female member 2. In order to provide a tight fit and compensate for any wear and play in the driving surfaces of these drive members, the flutes and ribs are tapered as clearly disclosed in the drawing. As a further means of compensating for any wear and for positively locking the parts together and the agitator in its proper position, the cap 4 is provided with an adjusting truss head bolt 13 carried in a sleeve nut 14 formed at its lower end with an annular shoulder 15. The male torque member is threaded adjacent its upper end as at 16 to receive the threaded end of the bolt, and a space 17 is provided above the upper end of the drive shaft 6 to permit adjustment of the bolt.

From the above description and the disclosure in the drawing, it will be apparent that the novel invention permits a more effective driving connection than the torque drives having tapered splines in that the male and female flutes on the drive torque 8 and the torque socket 2 intermesh or engage over their entire surface area, whereas the tapered splines contact only on their circumferential driving faces. Thus in the present device, due to the effective and complete surface engagement, there is little tendency for wear between the parts, and what little wear or play these parts may be subjected to is compensated for by means of the adjustable mounting and connection.

It will be further apparent that the agitator may be readily removed and/or replaced by a mere unscrewing of the knurled cap until the bolt is released from the drive torque or head when the agitator may be lifted off.

Having described the invention, I claim:

1. A drive construction for mounting and driving an oscillatory member from the drive shaft of a washing machine or the like, comprising a drive head mounted on the upper part of the shaft, a torque socket mounted on the oscillatory member and adapted to receive the drive head, said head having a plurality of grooves, each of said grooves being segments of cylinders whose axes are inclined with relation to the said head and shaft, ribs on said torque socket of the same shape as the said grooves, the area of each groove wall and rib wall gradually increasing from one end to the opposite end of the same, to provide for adjustment of said head and socket to compensate for wear of said ribs and grooves.

2. A drive construction for mounting and driving an oscillatory member from the drive shaft of a washing machine or the like, comprising a drive head mounted on the upper part of the shaft, a torque socket mounted on the oscillatory member and adapted to receive the drive head, said head having a plurality of grooves, each of said grooves being segments of cylinders whose axes are inclined with relation to the said head and shaft, ribs on said torque socket of the same shape as the said grooves, the area of each groove wall and rib wall gradually increasing from one end to the opposite end of the same, to provide for adjustment of said head and socket to compensate for wear of said ribs and grooves, whereby the entire contacting surfaces of said ribs and grooves are in interlocking driving contact with each other, and means for adjustably connecting said head and socket to each other.

3. A drive construction for mounting and driving an oscillatory member from the drive shaft of a washing machine or the like, comprising a drive head mounted on the upper part of the shaft, a torque socket mounted on the oscillatory member and adapted to receive the drive head, said head having a plurality of grooves, each of said grooves being segments of cylinders whose axes are inclined with relation to the said head and shaft, ribs on said torque socket of the same shape as the said grooves, the area of each groove wall and rib wall gradually increasing from one end to the opposite end of the same, to provide for adjustment of said head and socket to compensate for wear of said ribs and grooves, whereby the entire contacting surfaces of said ribs and grooves are in interlocking driving contact with each other, and a threaded member for adjustably connecting said head and socket to each other.

4. A drive construction for mounting and driving an oscillatory member from the drive shaft of a washing machine or the like, comprising a drive head mounted on the upper part of the shaft, a torque socket mounted on the oscillatory member and adapted to receive the drive head, said head having a plurality of grooves, each of said grooves being a curved surface such that all sections transverse to the axis of the torque head define arcs of circles decreasing in length from one end to the other end of said groove, whereby each of said grooves decreases in depth from one end to the other of said torque head, ribs on said torque socket of the same shape as the said grooves, to provide for adjustment of said head and socket to compensate for wear of said ribs and grooves.

JOHN MIKULASEK.